US005253093A

United States Patent [19]

Takeda et al.

[11] Patent Number: 5,253,093

[45] Date of Patent: Oct. 12, 1993

[54] ROW ELECTRODE DRIVING CIRCUIT FOR A DISPLAY APPARATUS

[75] Inventors: Shiro Takeda; Takafumi Kawaguchi, both of Tenri; Makoto Takeda, Nara, all of Japan

[73] Assignee: Sharp Kabushiki Kaisha, Osaka, Japan

[21] Appl. No.: 783,890

[22] Filed: Oct. 29, 1991

[30] Foreign Application Priority Data

Oct. 31, 1990 [JP] Japan .................................. 2-296164

[51] Int. Cl.[5] ........................... G02F 1/13; G09G 1/10

[52] U.S. Cl. ........................................ 359/85; 359/54; 345/87; 345/112

[58] Field of Search ............................. 359/54, 84, 85; 340/784, 789, 794, 740

[56] References Cited

U.S. PATENT DOCUMENTS 4,383,737 5/1983 Hibino et al. ......................... 359/85
4,656,470 4/1987 Saka ......................................... 359/85
4,727,363 2/1988 Ishii ........................................ 340/789
4,939,529 7/1990 Kanayama et al. ................... 359/85
5,021,774 6/1991 Ohwada et al. ...................... 340/784
5,034,735 7/1991 Inoue et al. .......................... 340/784

*Primary Examiner*—Janice A. Howell
*Assistant Examiner*—Huy K. Mai
*Attorney, Agent, or Firm*—David G. Conlin

[57] ABSTRACT

An improved row electrode driving circuit can drive a matrix type display apparatus without necessitating digital signals transmitted between partial row electrode driving circuits. Each of the partial row electrode driving circuits is allocated with a number. In each of the partial row electrode driving circuits, shift register shifts a pulse signal to sequentially output it from a plurality of outputs. At each time when a predetermined number of clock pulses have been counted, a count signal is produced. When the shift direction is set to the upper direction, a signal indicating the allocated number is produced. When the shift direction is set to the lower direction, a signal indicating a number which is obtained by subtracting the allocated number from a specified number is produced. When this number and the clock pulse count number satisfy a predetermined relationship, the pulse signal is output.

5 Claims, 9 Drawing Sheets

ROW ELECTRODE DRIVING CIRCUIT FOR A DISPLAY APPARATUS

BACKGROUND OF THE INVENTION

1. Field of the Invention

This invention relates to a row electrode driving circuit for a display apparatus, and more particularly to a row electrode driving circuit for a matrix type display apparatus.

2. Description of the Prior Art

As a typical example of a matrix type display device, a matrix type liquid crystal display (LCD) apparatus is shown in FIG. 6. The LCD apparatus of FIG. 6 comprises an LCD panel 61 having: a plurality of row electrodes 61*a* which are disposed on a substrate parallel to one another; and a plurality of column electrodes 61*b* which intersect the row electrodes 61*a*. A pair of a picture element (pixel) electrode 61*c* and a thin film transistor (TFT) 61*d* which functions as a switching element is disposed at each crossing of the row electrodes 61*a* and the column electrodes 61*b*. The LCD panel 61 is driven by a row electrode driving circuit 62 and column electrode driving circuit 63. The row electrode driving circuit 62 produces scanning pulses which are in turn supplied to the row electrodes 61*a* to sequentially turn on each row of the switching transistors 61*d*. The column electrode driving circuit 63 produces voltage signals which are applied to the pixel electrodes 61*c* through the column electrodes 61*b*. A control circuit 64 controls the operations of the row electrode driving circuit 62 and the column electrode driving circuit 63.

As shown in FIG. 7, the row electrode driving circuit 62 comprises a shift register circuit 71, a level shifter circuit 72, and a buffer circuit 73. The shift register circuit 71 shifts a pulse signal D in accordance with clock pulses $\phi$ and sequentially outputs the pulse signal to lines $q_1, q_2, \ldots, q_n$. The level shifter circuit 72 converts the pulse signal output to the lines $q_1, q_2, \ldots, q_n$ into voltage levels required for turning on and off the switching transistors 61*d*. The buffer circuit 73 outputs voltage signals $Q_1, Q_2, \ldots, Q_n$ converted by level shifter circuit 72.

The operation of the row electrode driving circuit 62 will be described with reference to FIG. 8. After the input of the pulse signal D, pulse signals are sequentially output to the lines $q_1, q_2, \ldots, q_n$ from the shift register circuit 71. The voltage signals $Q_1, Q_2, \ldots, Q_n$ converted by level shifter circuit 72 are output through the buffer circuit 73, based on this pulse signal.

If the number of the row electrodes 61*a* to be driven is large, the row electrode driving circuit 62 is usually comprised of a plurality of partial row electrode driving circuits 90*a* (LSI1), 90*b* (LSI2), 90*c* (LSI3), . . . , each corresponding to a portion of the row electrodes 61*a* and integrated in one LSI chip, as shown in FIG. 9. The partial row electrode driving circuits 90*a*, 90*b*, 90*c*, . . . comprise shift register circuits 91*a*, 91*b*, 91*c*, . . . (hereinafter, simply indicated by "91"), level shifter circuits 92*a*, 92*b*, 92*c*, . . . (hereinafter, simply indicated by "92"), and buffer circuits 93*a*, 93*b*, 93*c*, . . . (hereinafter, simply indicated by "93"), respectively. The shift register circuit 91, level shifter circuit 92 and buffer circuit 93 may have the same structure as the shift register circuit 71, level shifter circuit 72 and buffer circuit 73 shown in FIG. 7, respectively, except that the number of row electrodes to drive is different. It is necessary for the shift register circuits 91*a*, 91*b*, 91*c*, . . . in all of the partial row electrode driving circuits 90, as a whole, to continuously operate as a single shift register circuit. Therefore, for example, the output of the final step of the shift register circuit 91*a* in the partial row electrode driving circuit 90*a* is supplied to the shift register circuit 91*b* in the next partial row electrode driving circuit 90*b*.

In the above-mentioned row electrode driving circuit 62, digital signals and analog signals mixedly exist, and therefore noises from the digital signals which are mixed with the analog signals become a problem. When such a row electrode driving circuit 62 is applied to a display apparatus in a small sized television display device, in addition to a direct effect via power lines and signal lines, there occurs such an indirect effect that high frequency noises radiated into the air are picked up by an antenna of the device, causing disturbance in the displayed image. Furthermore, at the instant when the level of the digital signals changes, currents of a comparatively large amount flow, and as a result, a linear disturbance synchronized with the change in the digital signal level is generated on the display of the display apparatus. In a row electrode driving circuit as shown in FIG. 9 wherein a plurality of partial row electrode driving circuits (LSIs) are connected in a cascade, the level of digital signals transmitted between the LSIs changes during an image display period, thereby causing the image disturbance. Furthermore, since LSIs are usually mounted in a high density, there are many cases where it is impossible to carry out effective noise countermeasures in the vicinity of the LSIs.

SUMMARY OF THE INVENTION

The row electrode driving circuit for a display apparatus of this invention, which overcomes the above-discussed and numerous other disadvantages and deficiencies of the prior art, comprises a plurality of partial row electrode driving circuits which respectively drive groups of row electrodes of said display apparatus, each of said partial row electrode driving circuits is allocated with a number, and comprises: shift register means for shifting a pulse signal to sequentially output said pulse signal from a plurality of outputs, the shifting direction being changeable in accordance with a shift direction control signal; count means for counting clock pulses, and for producing a count signal at each time when a predetermined number of clock pulses have been counted; switch means for, when said shift direction is set to a first direction, producing a signal indicating said allocated number, and for, when said shift direction is set to a second direction which is opposite to said first direction, producing a signal indicating a number which is obtained by subtracting said allocated number from a specified number; and pulse signal output means for, when said number output from said switch means and the number of said count signals satisfy a predetermined relationship, outputting said pulse signal.

Preferably, said display apparatus is a matrix type liquid crystal display apparatus.

Preferably, said predetermined number of clock pulses is the number of steps of said shift register means.

Preferably, said allocated number of one of said partial row electrode driving circuits corresponds to the position of said partial row electrode driving circuit in the arrangement of said partial row electrode driving circuits.

Preferably, said specified number relates to the number of said partial row electrode driving circuits.

Thus, the invention described herein makes possible the objectives of:

(1) providing a row electrode driving circuit which can drive a display apparatus without impairing the display quality;

(2) providing a row electrode driving circuit which can drive a display apparatus without requiring digital signals transmitted between partial row electrode driving circuits; and (3) providing a row electrode driving circuit which can drive a display apparatus without producing noises caused by digital signals transmitted between partial electrode driving circuits.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 2:
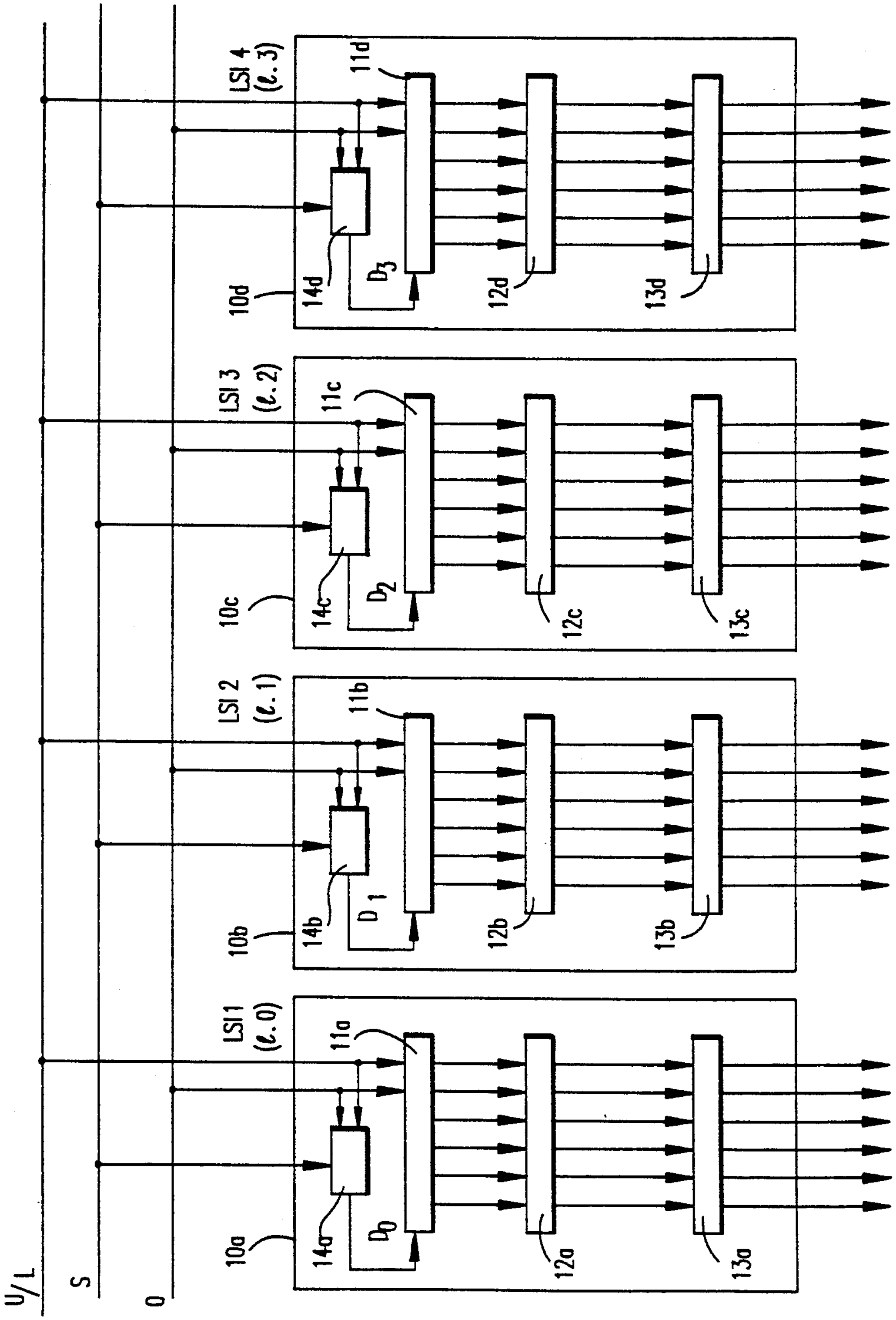
FIG. 2 is a block diagram illustrating the row electrode driving circuit according to the invention.
Figure 6:
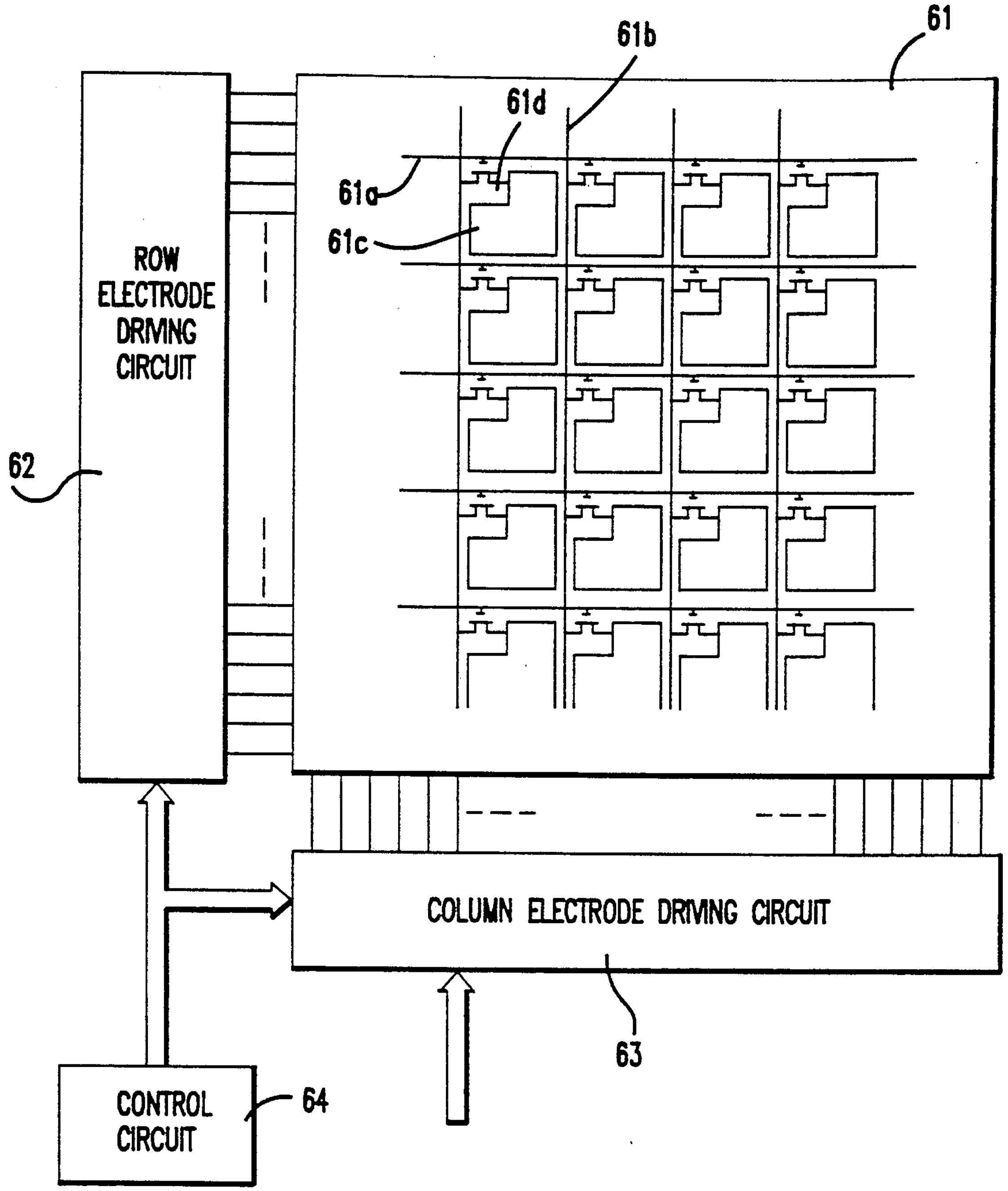
FIG.6 PRIOR ART
FIG. 6 diagrammatically illustrates a matrix type LCD apparatus of the prior art.

FIG. 2 illustrates a row electrode driving circuit according to the invention. The circuit of FIG. 2 can drive the LCD apparatus shown in FIG. 6, and comprises four partial row electrode driving circuits 10*a*, 10*b*, 10*c* and 10*d* (hereinafter, simply indicated by "10" when the partial row electrode driving circuits are collectively referred), each of which corresponds to k number of row electrodes in the LCD apparatus. The number of partial row electrode driving circuits 10 and the number of row electrodes which correspond to one of the partial row electrode driving circuits 10 are not restricted to the above and can be selected arbitrarily. The partial row electrode driving circuits 10*a*, 10*b*, 10*c* and 10*d* each of which is integrated into one LSI chip (LSI1, LSI2, LSI3, LSI4) comprise shift register circuits 11*a*, 11*b*, 11*c* and 11*d* (hereinafter, simply indicated by "11"), level shifter circuits 12*a*, 12*b*, 12*c* and 12*d* (hereinafter, simply indicated by "12"), buffer circuits 13*a*, 13*b*, 13*c* and 13*d* (hereinafter, simply indicated by "13"), and shift register control circuits 14*a*, 14*b*, 14*c* and 14*d* (hereinafter, simply indicated by "14"), respectively. Clock pulses $\phi$ and shift direction control signal U/L are supplied in common to the shift register circuits 11 and shift register control circuits 14 in all of the partial row electrode driving circuits 10. A start signal S is further supplied to the shift register control circuits 14.

Figure 1:
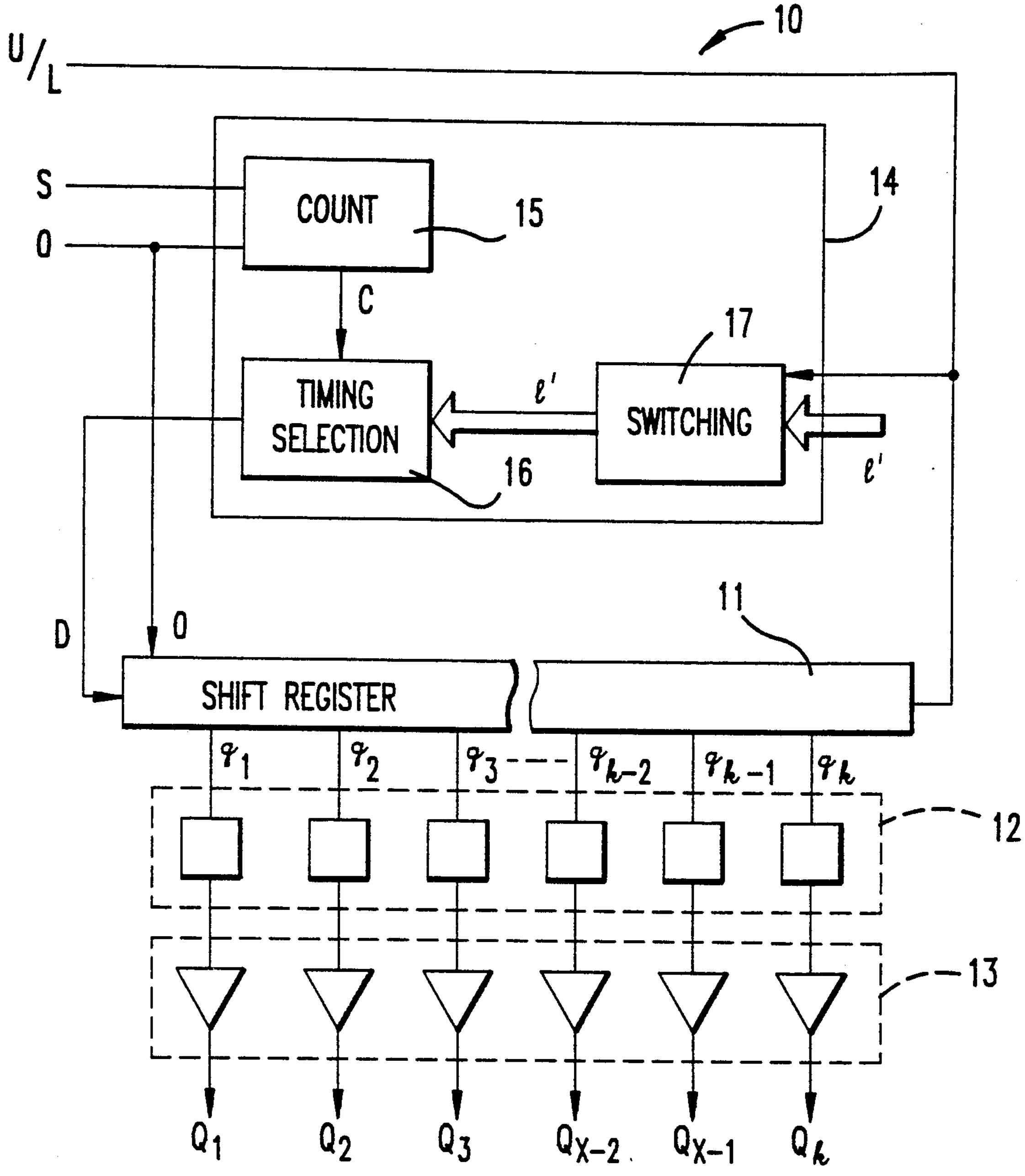
FIG. 1 is a block diagram illustrating a partial row electrode driving circuit used in a row electrode driving circuit according to the invention.
Figure 7:
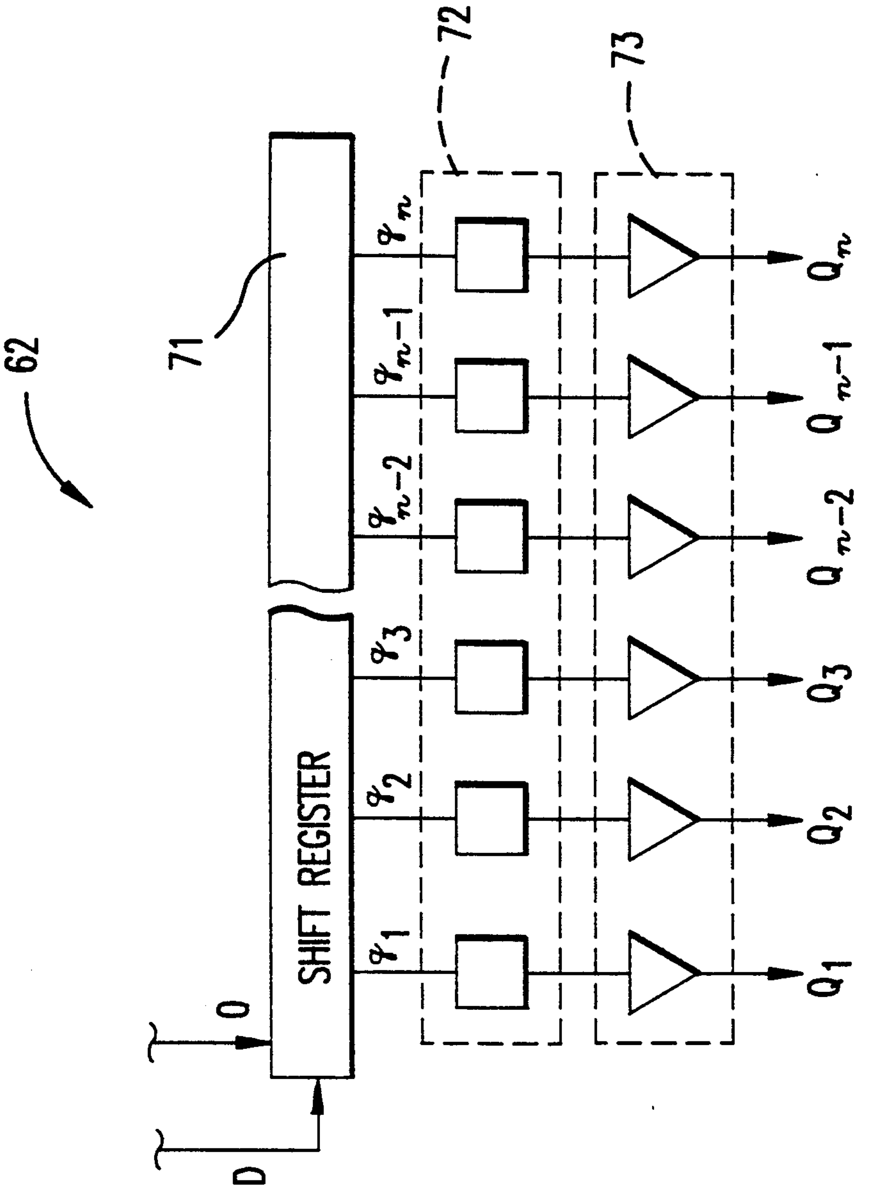
FIG. 7 PRIOR ART
FIG. 7 is a block diagram illustrating a row electrode driving circuit of the prior art.
Figure 8:
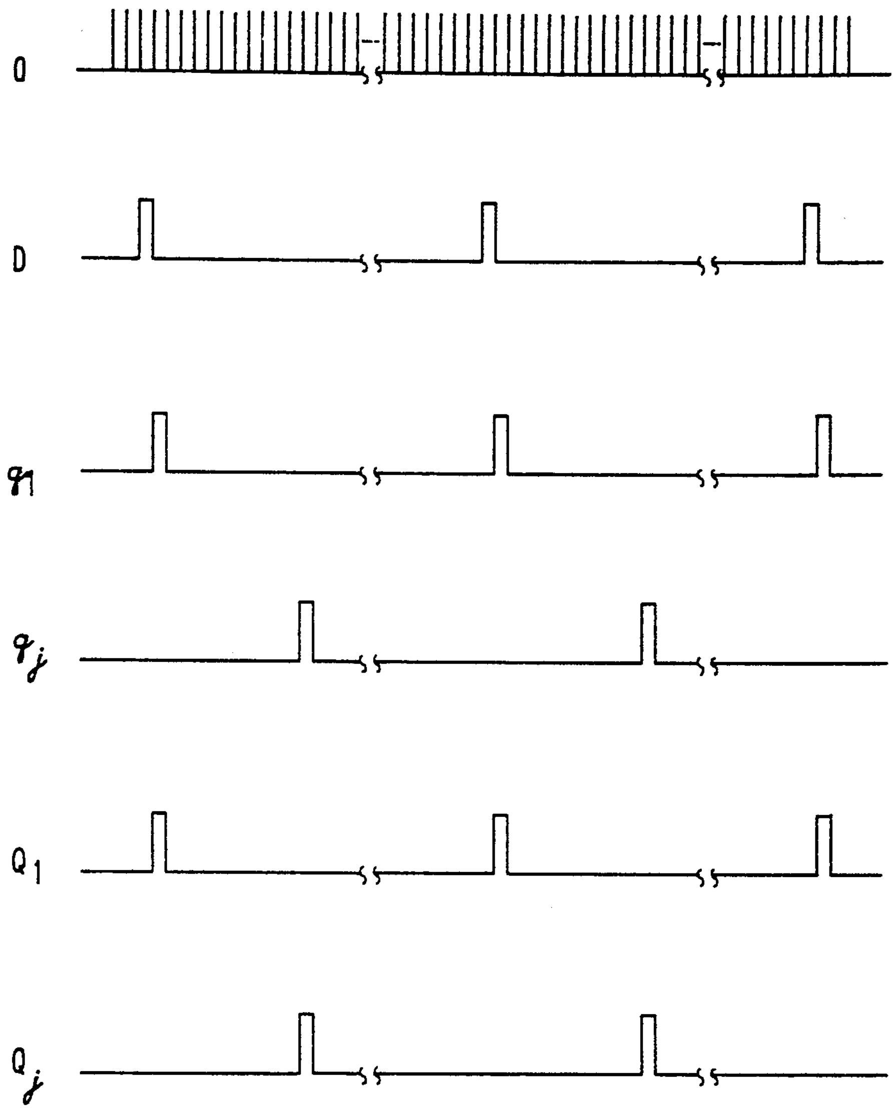
FIG.8 PRIOR ART
FIG. 8 is a timing chart illustrating the operation of the row electrode driving circuit of FIG. 7.
Figure 9:
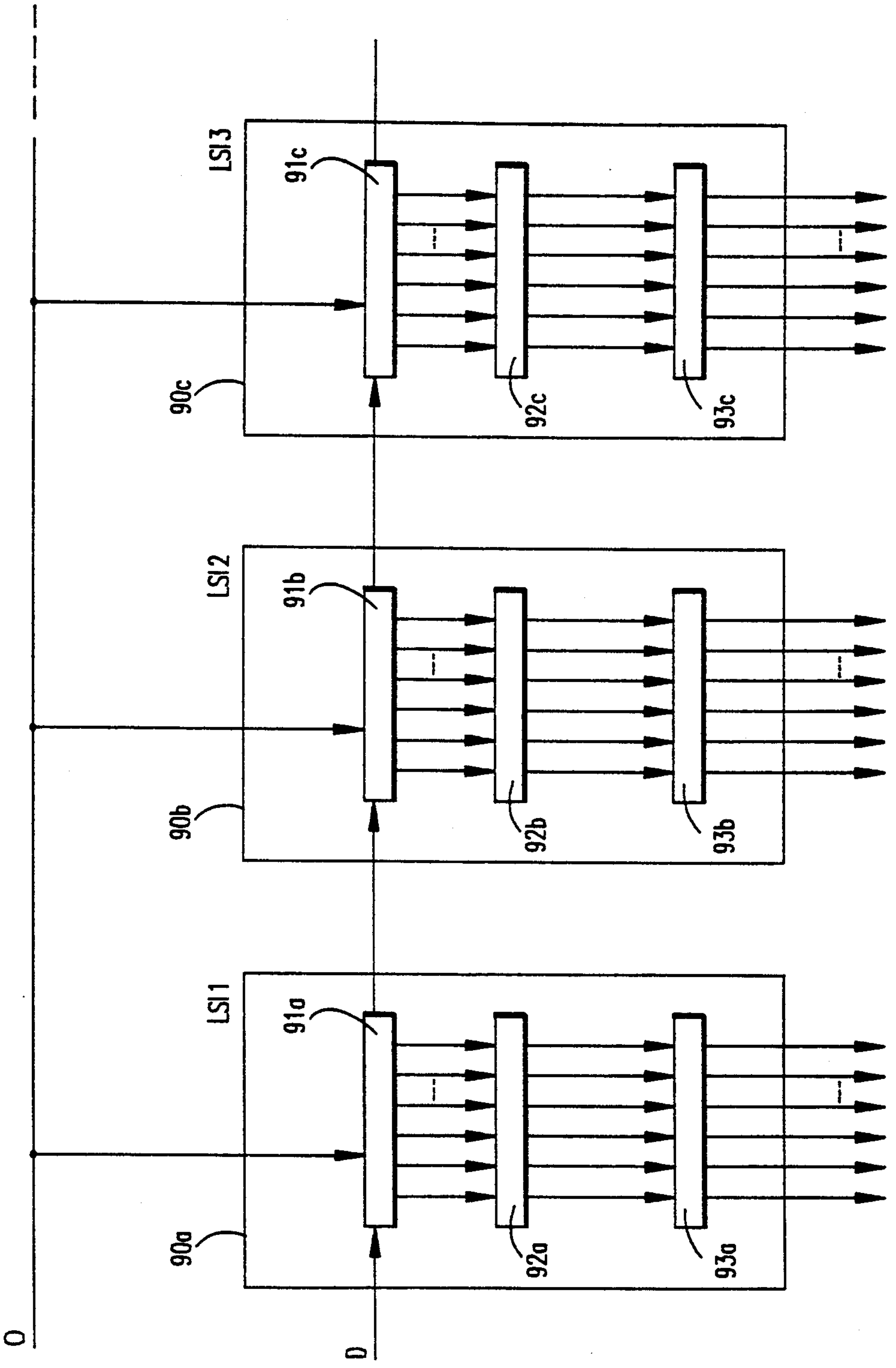
FIG. 9 PRIOR ART
FIG. 9 shows the configuration of the prior art row electrode driving circuit comprising a plurality of partial row electrode driving circuits.

FIG. 1 shows one of the partial row electrode driving circuits 10 in more detail. The level shifter circuit 12 and buffer circuit 13 are constructed in the same manner as those used in the prior art (i.e., the level shifter circuit 72 and buffer circuit 73 shown in FIG. 7). The shift register circuit 11 is structured so that the shift direction reverses in response to the shift direction control signal U/L. When the shift direction control signal U/L is U, the normal shifting operation toward the right (in FIGS. 1 and 2) is performed, and the pulse signals are sequentially output to the lines $q_1, q_2, \ldots$, in this order. When the shift direction control signal U/L is L, the shifting operation toward the left is performed, and the pulse signals are sequentially output to the lines $q_k, q_{k-1}, \ldots$, in this order. In the prior art, the pulse signal D which is input to the shift register circuit 11 is supplied from outside of the partial row electrode driving circuit 10. By contrast, in this embodiment, the pulse signal D is generated by the shift register control circuit 14.

The shift register control circuit 14 comprises a count circuit 15, a timing selection circuit 16, and a switching circuit 17 The count circuit 15 supplies a count signal C to the timing selection circuit 16 immediately after receiving the start signal S, and every time k clock pulses $\phi$ (k is the number of steps in the shift register circuit 11) are counted after the input of the start signal S. The switching circuit 17 supplies externally established data l, when the shift direction control signal U/L is U, and data $(n-1-l)$, when the shift direction control signal U/L is L, to the timing selection circuit 16. Here, n is the total number of the partial row electrode driving circuits 10, and in this embodiment $n=4$. As shown in FIG. 2, l is a value assigned to each of the partial row electrode driving circuits 10*a* $(l=0)$, 10*b* $(l=1)$, 10*c* $(l=2)$ and 10*d* $(l=3)$, based upon the arrangement order in which the partial row electrode driving circuits 10 are disposed. Data supplied from the switching circuit 17 to the timing selection circuit 16 is representatively indicated by l' in FIG. 1. In other words, when the shift direction control signal U/L is U, $l'=l$, and when the shift direction control signal U/L is L, $l'=(n-1-l)$. The timing selection circuit 16 outputs the pulse signal D to the shift register circuit 11 when the number of count signals C which have been input is equal to $(l'+1)$.

Figures 3A, 3B, 3C, 3D, 3E, 3F, 3G:
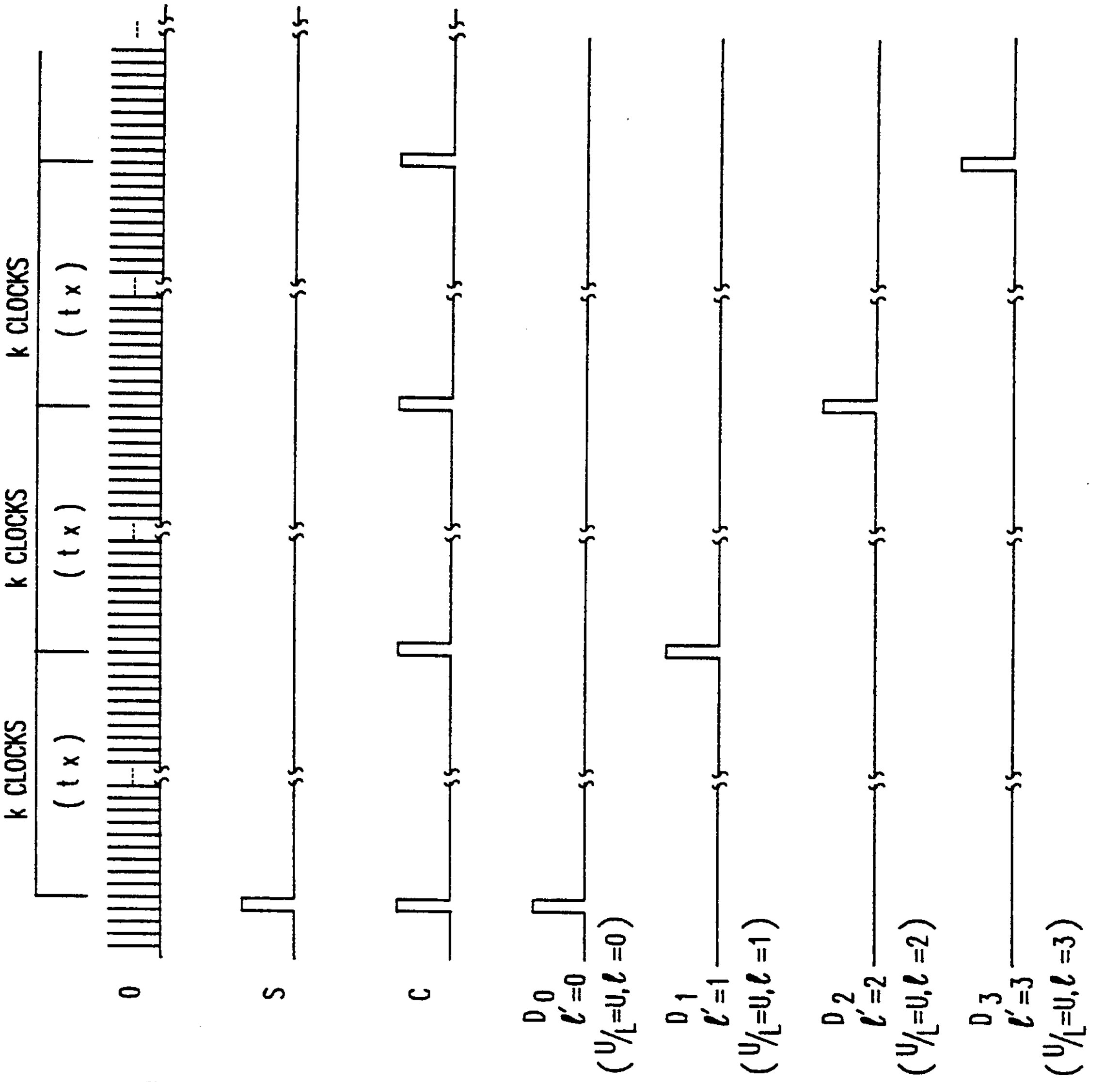
FIGS. 3(A–G) and 4(A–G) are timing charts illustrating the operation of the row electrode driving circuit of FIG. 2.

The operation of this embodiment will be described with reference to FIG. 3 which is the timing chart for a case in which the shift direction control signal U/L is U. Immediately after receiving the start signal S ((b) of FIG. 3), one count signal C ((c) of FIG. 3) is first generated. Following this, one count signal C is generated every time k number of clock pulses $\phi$ ((a) of FIG. 3) are input. The time interval $t_k$ for generating the count signal C is equal to the period of time required for shifting the pulse signal D through all of the steps of the shift register circuit 11. In (d) to (g) of FIG. 3, subscripts 0 to 3 are added to the pulse signal D in accordance with the values (0 to 3) of the data l which are assigned to the partial row electrode driving circuits 10, in the same way as in FIG. 2.

As seen from the above description, according to this embodiment, the shift register control circuit 14 can generate the pulse signal which is directed to the shift register circuit 11 within the same partial row electrode driving circuit 10, with proper timing based upon the data l. Therefore, in this embodiment, the pulse signals $D_0$, $D_1$, $D_2$ and $D_3$ are handled within each partial row electrode driving circuit 10. In other words, in this embodiment, the digital signals which are transmitted between the partial row electrode driving circuits in a row electrode driving circuit of the prior art are not necessary, and thus it is possible to avoid image disturbance due to noises from the digital signals. Moreover, the level of the start signal S changes outside of the image display period, and the start signal S can be generated outside of the LSI which contains the partial row electrode driving circuit 10. Hence, it is possible to easily add a circuit as a noise countermeasure, so that the start signal S does not become a source of image disturbance.

Figures 4A, 4B, 4C, 4D, 4E, 4F, 4G:
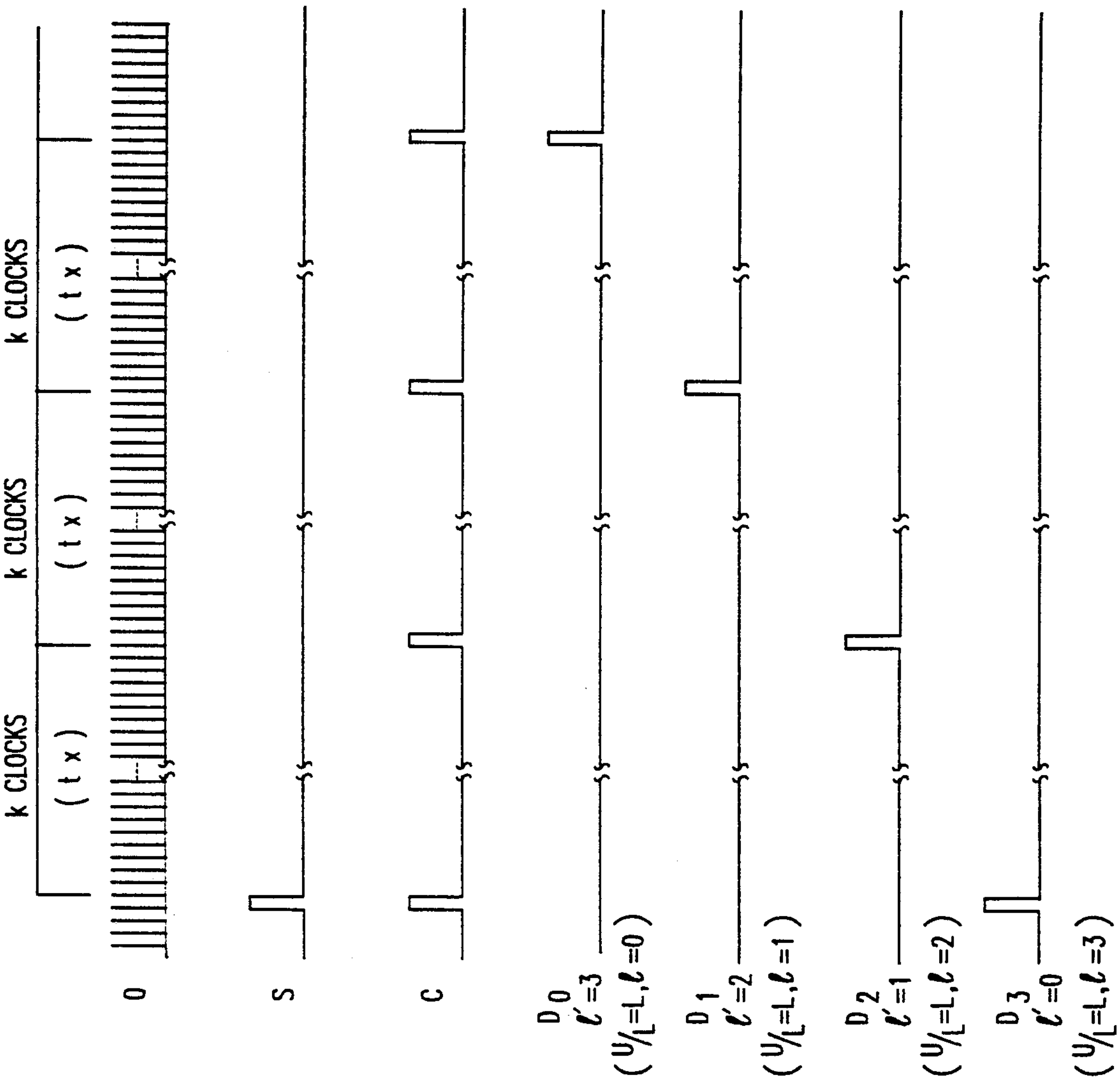

FIG. 4 illustrates the operation of this embodiment in the case where the shift direction control signal U/L is L. When the shift direction control signal U/L is L, as shown in (d) to (g) of FIG. 4, the generation sequence of the pulse signals $D_0$ through $D_3$ is opposite to that in the case where the shift direction control signal U/L is U ((d) to (g) of FIG. 3). Furthermore, although not illustrated, the direction in which the pulse signal D is shifted by the shift register circuit 11 within the partial row electrode driving circuit 10 is also opposite to that in the case where the shift direction control signal U/L is U.

Figure 5:
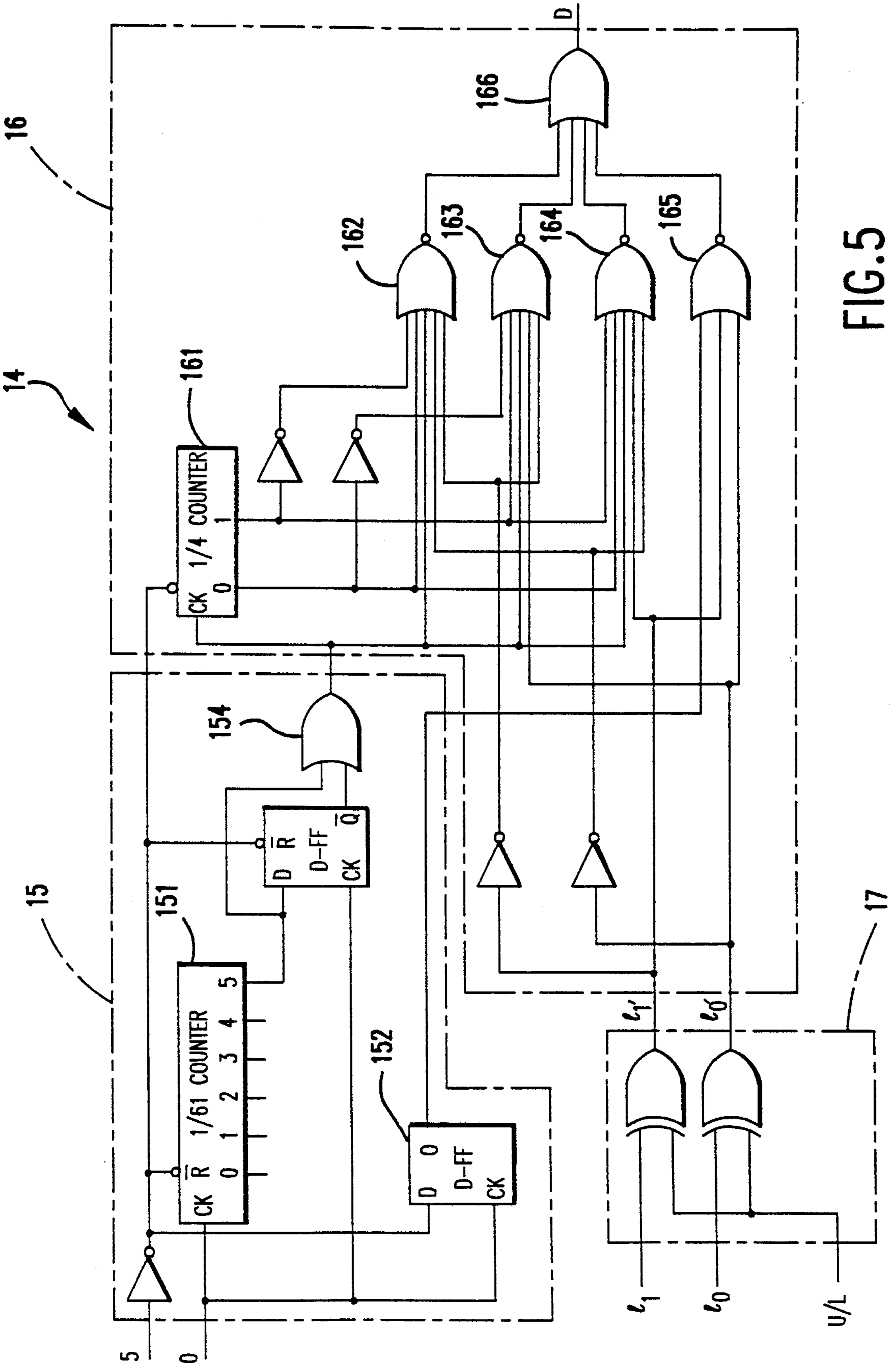
FIG. 5 is a circuit diagram illustrating an example of a shift register control circuit in detail used in the partial row electrode driving circuit of FIG. 1.

An example of the shift register control circuit 14 is shown in FIG. 5. In the shift register control circuit 14, the value k is set to 64, and data l is expressed with two bits ($l_1$, $l_0$). When the shift direction control signal U/L is U, it has the value of "0", and when the shift direction control L signal U/L is L, it has the value of "1". The count signal C which is generated immediately after the input of the start signal S is output from a D-type flip-flop 152. A 1/64 counter 151 counts the clock pulses $\phi$. When the output of the 1/64 counter 151 changes from 63 (=111111) to 0 (=000000), the count signal C is output from an OR gate 154. The count signal C which is output from the OR gate 154 is counted by a $\frac{1}{4}$ counter 161. When the count signal C is output from the D-type flip-flop 152 or the OR gate 154, it is determined by the combination of NOR gates 162–165 whether or not the data l' expressed by two bits ($l_1'$, $l_0'$) and supplied from the switching circuit 17 coincide with the output of the $\frac{1}{4}$ counter 161. If yes, the pulse signal D is output from an OR gate 166.

According to the invention, it is not necessary to produce digital signals between partial row electrode driving circuits. In the row electrode driving circuits of the invention, therefore, image disturbance due to noises resulting from digital signals can be eliminated. Furthermore, in the row electrode driving circuits of the invention, the sequence of driving row electrodes in a display apparatus can be easily reversed by controlling the shift direction control signal.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a row electrode driving circuit for a display apparatus, comprising a plurality of partial row electrode driving circuits which respectively drive groups of row electrodes of said display apparatus, each of said partial row electrode driving circuits is allocated with a number, and comprises:

shift register means for shifting a pulse signal to sequentially output said pulse signal from a plurality of outputs, the shifting direction being changeable in accordance with a shift direction control signal;

count means for counting clock pulses, and for producing a count signal at each time when a predetermined number of clock pulses have been counted;

switch means for, when said shift direction is set to a first direction, producing a signal indicating said allocated number, and for, when said shift direction is set to a second direction which is opposite to said first direction, producing a signal indicating a number which is obtained by subtracting said allocated number from a specified number; and pulse signal output means for, when said number output from said switch means and the number of said count signals satisfy a predetermined relationship, outputting said pulse signal.

2. A row electrode driving circuit according to claim 1, wherein said display apparatus is a matrix type liquid crystal display apparatus.

3. A row electrode driving circuit according to claim 1, wherein said predetermined number of clock pulses is the number of steps of said shift register means.

4. A row electrode driving circuit according to claim 1, wherein said allocated number of one of said partial row electrode driving circuits corresponds to the position of said partial row electrode driving circuit in the arrangement of said partial row electrode driving circuits.

5. A row electrode driving circuit according to claim 1, wherein said specified number relates to the number of said partial row electrode driving circuits.

* * * * *